United States Patent
Hayashi

(10) Patent No.: US 7,296,225 B2
(45) Date of Patent: Nov. 13, 2007

(54) INFORMATION TRANSMITTING AND RECEIVING IN WHICH LAYOUT INFORMATION IS USED TO DETERMINE IMPORTANCE

(75) Inventor: Yusuke Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 507 days.

(21) Appl. No.: 09/812,849

(22) Filed: Mar. 21, 2001

(65) Prior Publication Data

US 2002/0055959 A1 May 9, 2002

(30) Foreign Application Priority Data

Nov. 9, 2000 (JP) ............... 2000-342622

(51) Int. Cl.
*G06F 17/21* (2006.01)
*G06F 17/24* (2006.01)

(52) U.S. Cl. .............. 715/520; 715/513; 715/514; 715/517; 715/539; 705/52

(58) Field of Classification Search ............. 715/506.1, 715/501.1, 511, 513, 514–515, 517, 520, 715/522, 530, 539; 705/52
See application file for complete search history.

(56) References Cited

U.S. PATENT DOCUMENTS

| | | | | |
|---|---|---|---|---|
| 5,506,902 A | * | 4/1996 | Kubota | 705/51 |
| 5,649,186 A | * | 7/1997 | Ferguson | 707/10 |
| 5,761,662 A | * | 6/1998 | Dasan | 707/10 |
| 5,819,092 A | * | 10/1998 | Ferguson et al. | 717/113 |
| 6,029,182 A | * | 2/2000 | Nehab et al. | 715/523 |
| 6,401,094 B1 | * | 6/2002 | Stemp et al. | 707/10 |
| 6,460,036 B1 | * | 10/2002 | Herz | 707/10 |
| 6,571,279 B1 | * | 5/2003 | Herz et al. | |
| 2002/0040374 A1 | * | 4/2002 | Kent | 707/516 |
| 2002/0054089 A1 | * | 5/2002 | Nicholas et al. | 345/745 |
| 2002/0055959 A1 | * | 5/2002 | Hayashi | 707/517 |
| 2004/0024747 A1 | * | 2/2004 | Boguraev et al. | 707/3 |

FOREIGN PATENT DOCUMENTS

| | | |
|---|---|---|
| JP | 6-139291 | 5/1994 |
| JP | 6-311119 | 11/1994 |
| JP | H07-21353 | 1/1995 |

(Continued)

OTHER PUBLICATIONS

Definition of "front page," Dictionary.com Unabridged, v 1.0.1, <http://dictionary.reference.com/browse/front%20page>.*

(Continued)

*Primary Examiner*—Stephen Hong
*Assistant Examiner*—Joshua D Campbell
(74) *Attorney, Agent, or Firm*—Staas & Halsey LLP

(57) ABSTRACT

Information showing how the information that meets the requirements of a user is treated in an information source, for example, how information about the positions and importance degree of articles in newspaper space is retrieved, how the retrieved information is outputted to the user as layout information, how a specification of the information that should be transmitted to the user based on the layout information is received from the user, and how the specified information is transmitted to the user.

6 Claims, 20 Drawing Sheets

| CONTENTS ID | NAME OF NEWSPAPER | DATE AND ISSUED TIME | POSITION | IMPORTANCE DEGREE | INFORMATION FEE | RETRIEVAL KEY |
|---|---|---|---|---|---|---|
| A0001 | × × NEWSPAPER | 2000.8.1 6:20 | 1-1-1 | B | 45 YEN | CORPORATION A LISTS STOCK |
| A0002 | × × NEWSPAPER | 2000.8.1 6:25 | 1-4-1 | A | 100 YEN | TYPHOON |
| ... | ... | ... | ... | ... | ... | |
| B0050 | ○○ NEWSPAPER | 2000.7.30 15:01 | 2-2-1 | C | 15 YEN | ○○ MINISTER |
| B0051 | ○○ NEWSPAPER | 2000.7.30 15:06 | 2-2-2 | B | 25 YEN | STOCK PRICE |
| ... | ... | ... | ... | ... | ... | |

A0001: CORPORATION A HAS ANNOUNCED THAT IT WOULD HAVE ITS STOCK LISTED IN THE FIRST SECTION OF THE TOKYO STOCK EXCHANGE ON 15TH NEXT MONTH ............

A0002: APPROACHING THIRD TYPHOON IS ............

PHOTOGRAPH

FOREIGN PATENT DOCUMENTS

| | | |
|---|---|---|
| JP | 7-175825 | 7/1995 |
| JP | 9-26992 | 1/1997 |
| JP | 9-44516 | 2/1997 |
| JP | 11-120190 | 4/1999 |
| KR | 2000-0026430 | 5/2000 |
| KR | 2000-0049713 | 8/2000 |

OTHER PUBLICATIONS

Definition of "front page," 2006, Dictionary.com Unabridged, v 1.0.1, <http://dictionary.reference.com/browse/front%20page>.*

Notice of Rejection Grounds for the corresponding Korean Patent Application, issue date Jul. 10, 2006.

Communication from Japanese Patent Office mailed on Apr. 3, 2007 for corresponding Japanese application.

"All Japanese Multimedia", Nikkei Multimedia, Japan, Nikkei Business Publication, Inc., No. 37, pp. 81-84.

Communication "Notice of Rejection Grounds" on corresponding Japanese Patent Appln. No. 2000-342622 mailed Jul. 10, 2007, Japanese Patent Office, pp. 1-3.

* cited by examiner

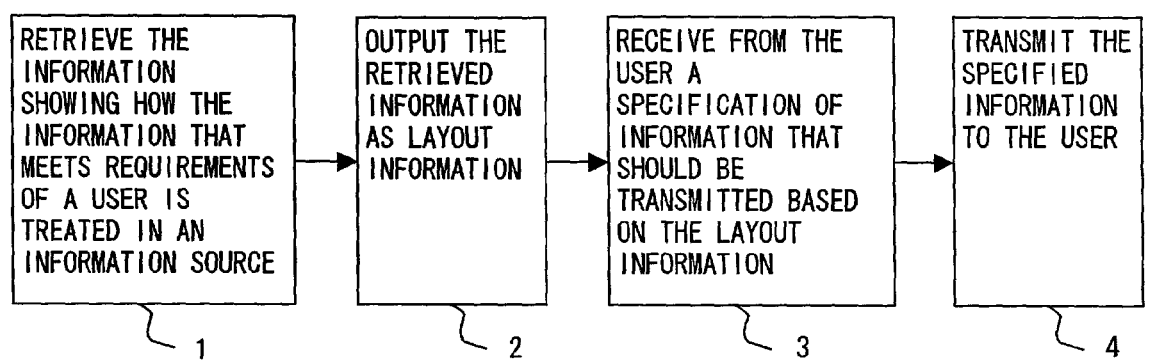
F I G. 1

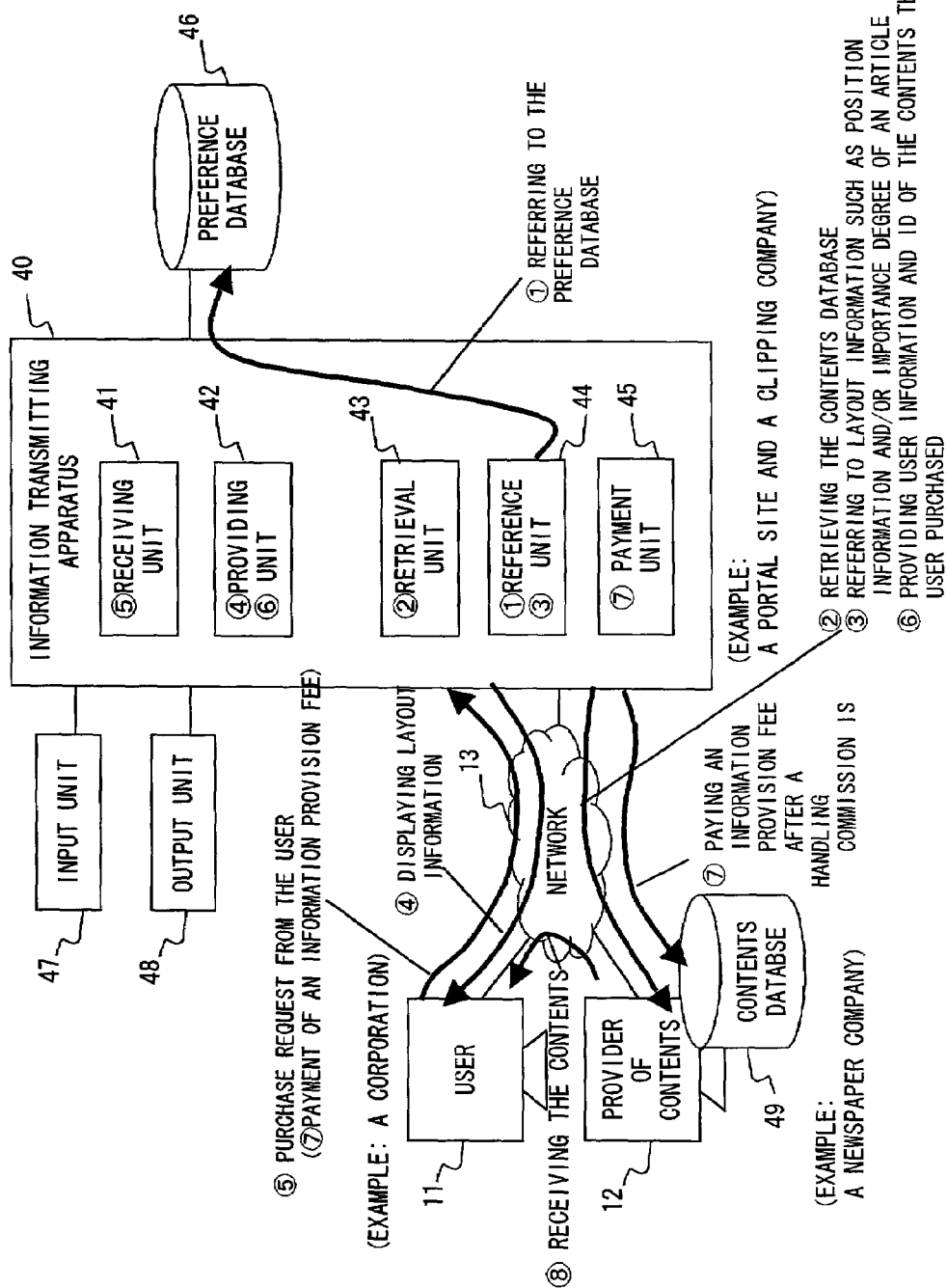
F I G. 11

×× 新聞

B社倒産
..........
..........
..........
....

登場C社新社長
..........
..........
..........
..........
..........
..........

今日の天気
..........
..........
..........
..........
..........
......

E社株価沸騰
..........
..........
..........
..........
..........
..........
......

A社' 本日上場
..........
..........
..........
......
..........
..........
..........
..........
......

PLEASE SELECT HEAD LINES YOU LIKE AND READ THE CONTENTS

| ××新聞 | B社倒産 | 訪問大臣D国を | 今日の天気 |

*AA社本日上場*
A社（AAし）が東証一部に上場した。同社発表による同社社長B氏（A歳）は「投資3カ月で計上場果たせてうれしい。今後の売上見通しは」と語った。…（以下略）

C社新社長登場

E社株価沸騰

* WE HAVE CHARGED 45 YEN AS THE INFORMATION FEE

INFORMATION TRANSMITTING AND RECEIVING IN WHICH LAYOUT INFORMATION IS USED TO DETERMINE IMPORTANCE

BACKGROUND OF THE INVENTION

1. Field of the Invention

The present invention relates to an information transmitting method for transmitting a part of information, such as newspaper articles from a clipping service, and to be more specific, to an information transmitting and receiving method for displaying information about the position of information located in a newspaper and the degree of importance that a certain piece of information has in a form of layout information to a user, and an information transmitting method for transmitting the information that a user requests based on this layout information.

2. Description of the Related Art

Today, there exist companies that provide a clipping service that transmits part of some contents by displaying headlines of newspaper articles and news on the World Wide Web. However, since such a service transmits contents of newspaper articles only in the form of a character string, it is not possible to express a visual impact that a physical medium, namely a newspaper, has in itself.

In other words, to provide a user with information merely as a character string is lacking in the information important for the user to select articles he wants to obtain. This important information includes the position balance in which the character string is laid out in newspaper space, and the value that the information has, such as the top position of the social page of the newspaper, related-article information, the area in which articles are inserted and the size of articles in newspaper space.

SUMMARY OF THE INVENTION

The purpose of the present invention is to provide an information transmitting and receiving method and an apparatus thereof, in which layout information is used, which makes it possible for a user to appropriately select information he wants to obtain by displaying for the user, for example, information about the positions of articles in newspaper space and information about the importance degree of articles as layout information.

The first information transmission method based on the present invention is to receive requirements from a user, output to the user how information that meets the user's requirements is treated in an information source as layout information, and receive from the user a specification of the information that should be transmitted to the user based on said layout information, and transmit the specified information to the user.

In the first information transmission method, since layout information (for example, "headlines" as seen in an actual newspaper) is presented to a user based on information showing how the information is treated in an information source, the user can visually recognize the importance degree of each article (for instance, what an information provider thinks is important), and can view only necessary articles.

The second information transmission method based on the present invention is to store a preference for information that each user that can receive transmitted information wants to obtain, receive requirements from the user, retrieve information showing how the information that meets the requirements is treated in the information source using said preference, output to the user the retrieved "treated information" as layout information, receive from the user a specification of the information that should be transmitted to the user based on said layout information, and transmit the specified information to the user.

In the second information transmission method, the user must register a keyword for retrieving a necessary article in advance, and store it as a preference, so that each time a keyword is inputted he can save time.

Also, the information receiving method based on the present invention is to output to an external party a request for identifying the information that the user is likely to require, receive, as layout information, information showing how the information that the user is likely to require is treated in the information source, receive a specification of the information that a user decides is necessary based on said layout information, and request the external party to transmit the specified information to the user.

BRIEF DESCRIPTION OF THE DRAWINGS

FIG. 1 is a block diagram showing the function of the information transmission method of the present invention.

FIG. 11 is a block diagram showing the method for performing communications in the third embodiment of the present invention.

FIG. 12 is a diagram showing an example of a layout display window displayed on the terminal unit of a user.

FIG. 13 is a diagram showing an example of a contents display window displayed on the terminal unit of a user.

DESCRIPTION OF THE PREFERRED EMBODIMENT

Figure 2:
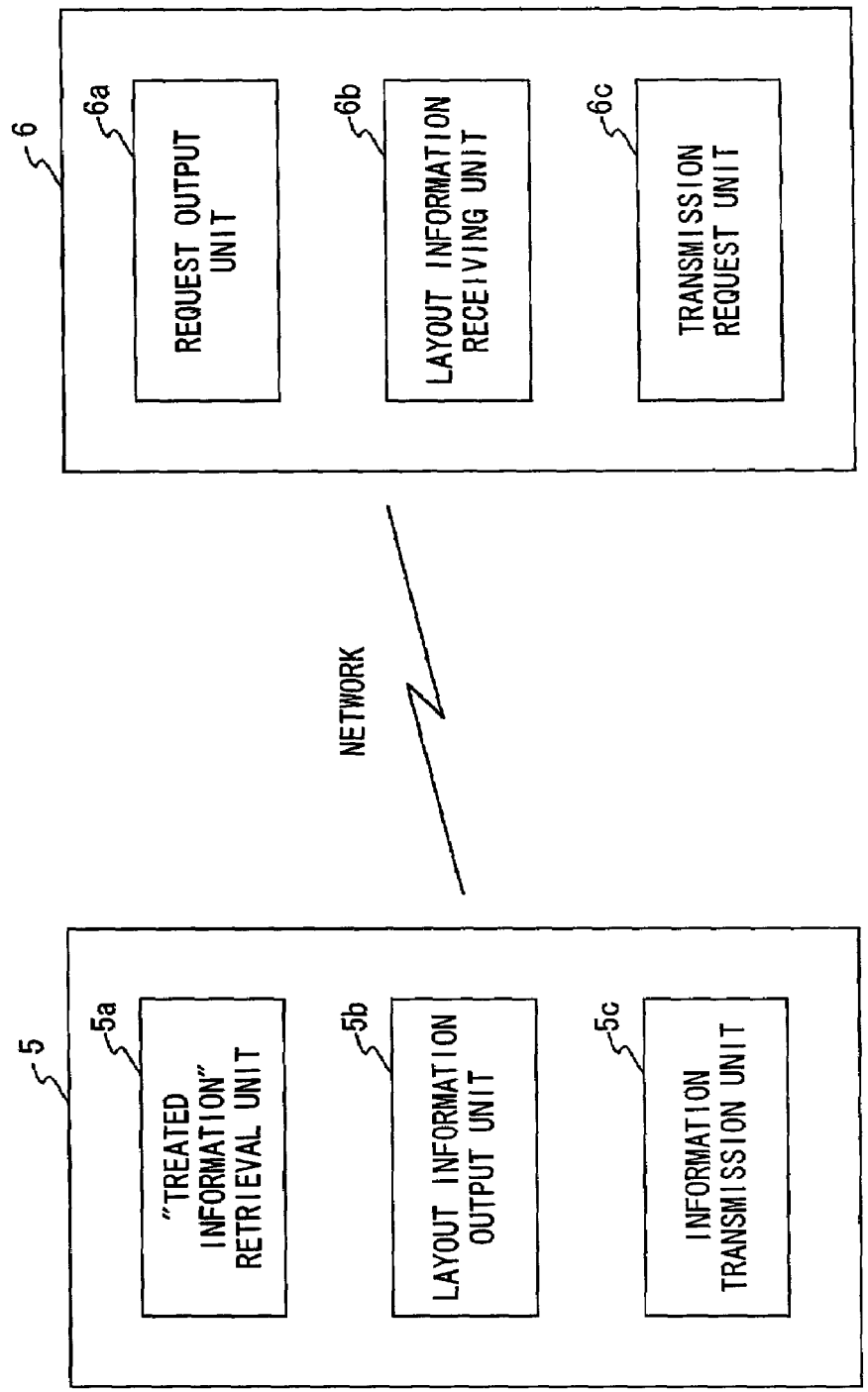
FIG. 2A is a block diagram showing the function of the information transmission apparatus of the present invention.
FIG. 2B is a block diagram showing the function of the information receiving apparatus.

FIG. 1 is a block diagram showing the function of the information transmission method of the present invention. This block diagram shows an information transmission method for transmitting information that meets the requirements of a user.

An information transmission method in which layout information is applied is used in the present invention, as shown in FIG. 1. The information transmission method receives the requirements of a user, and retrieves information showing how the information that meets the requirements is treated by an information source in 1; and outputs the "treated information" that is retrieved in 1 as layout information to the user in 2, receives from the user a specification of the information that should be transmitted based on the layout information in 3, and transmits the specified information to the user in 4.

Also, the information transmission method of the present invention stores a preference (such as a retrieval keyword) for the information that each user having a possibility of receiving transmitted information wants to obtain, retrieves the information showing how the information that meets the requirements of the user is treated in the information source using the preference, outputs to the user the "treated information" thus retrieved as layout information, receives from the user a specification of the information that should be transmitted based on the layout information, and transmits the specified information to the user.

Next, an information receiving method wherein layout information is used, as an information receiving method for receiving necessary information from an external party, outputs to the external party a request for identifying the information that may become necessary, for example, a retrieval keyword, receives from the external party information showing how the information that the user is likely to require is treated in the information source as layout information, receives a specification of the information that the user decides is necessary based on the layout information, and requests the external party to transmit the specified information to the user.

Also, a computer-readable storage medium such as the medium used by a computer which transmits the information that meets the requirements of a user and stores a program that makes a computer execute a step for receiving requirements from the user, and retrieving the information showing how the information that meets the requirements is treated in the information source, a step for outputting to the user the "treated information" thus retrieved as layout information, a step for receiving from the user a specification of the information that should be transmitted based on the layout information, and a step for transmitting the specified information.

Also, a computer-readable storage medium such as the medium used by a computer that receives necessary information from an external party and stores a program that makes a computer execute a step for outputting to the external party a request for identifying information that the user is likely to require, a step for receiving the information showing how the information that the user is likely to require is treated in the information source from the external party as layout information, a step for receiving a specification of the information that the user decides is necessary based on the layout information, and a step for requesting the external party to transmit the specified information.

In the embodiment of the present invention, information showing how the information that the user is likely to require is treated in an information source, i.e. layout information can be information showing the position of an article in an information source and information showing the importance degree of an article in an information source.

In the embodiment of the present invention, an information transmission apparatus that transmits information that meets the requirements of a user is used, as shown in FIG. 2A. This information transmission apparatus 5 comprises a retrieval unit 5a for retrieving information showing how the information that meets the requirements is treated in an information source, a layout information output unit 5b for outputting the "treated information" thus retrieved for the user as layout information, and an information transmission unit 5c for transmitting information that is requested to be transmitted to the user based on said layout information.

Also, in the embodiment of the present invention, an information receiving apparatus that receives necessary information from an external party is used, as shown in FIG. 2B. This information receiving apparatus 6 comprises a request output unit 6a for outputting a request for identifying the information that a user is likely to require, a layout information receiving unit 6b for receiving information showing how the information that the user is likely to require is treated in an information source from an external party as layout information, and a transmission request unit 6c for requesting the external party to transmit the information that the user decides is necessary based on said layout information.

As has been described, the present invention makes it possible to determine the information that a user requires based on the information showing how the information is treated in an information source (such as the position of an article and the importance degree of an article in newspaper space), and to transmit said information.

Figure 3:
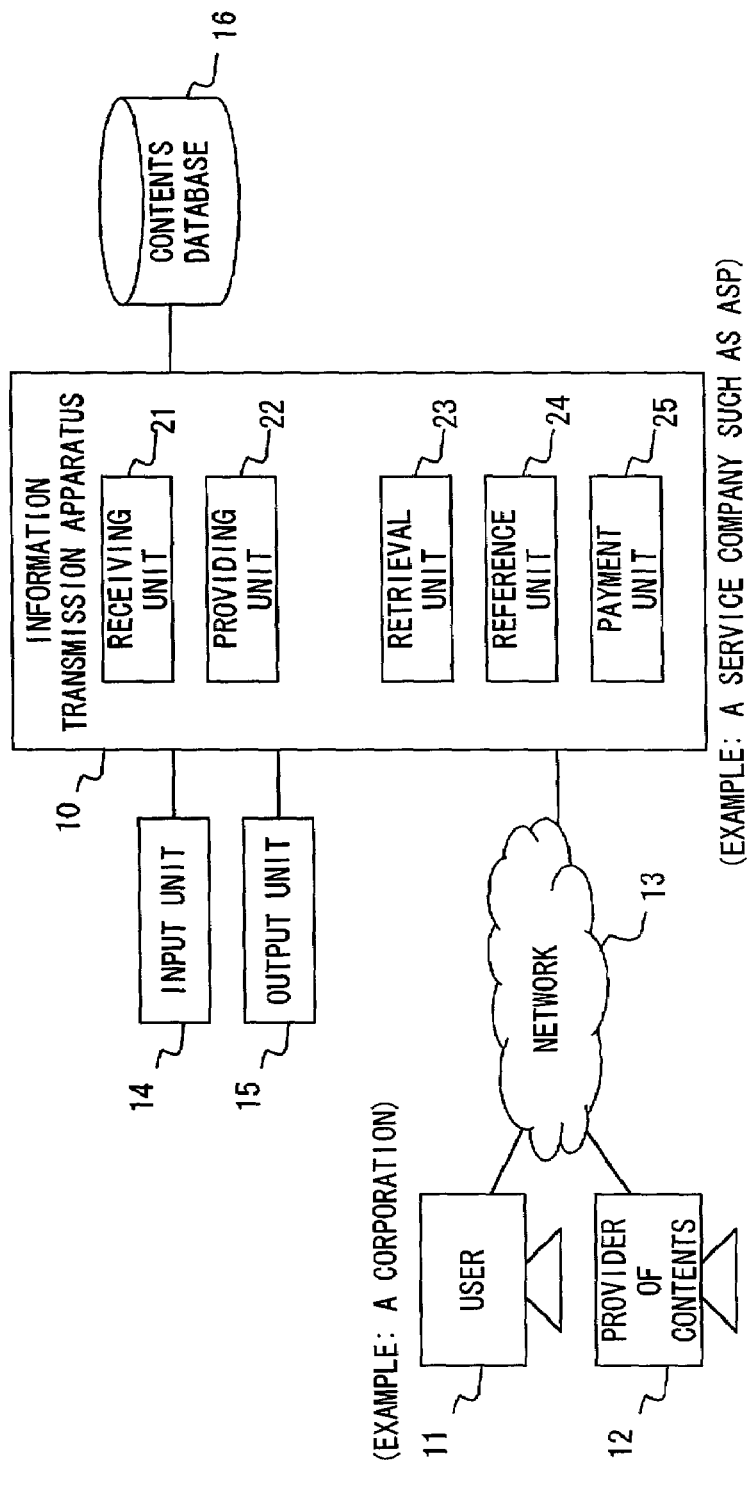
FIG. 3 is a block diagram showing the configuration of the information transmission system in the first embodiment of the present invention.

FIG. 3 is a block diagram showing the configuration of the information transmission system in the first embodiment of the present invention. This figure shows the configuration of the information transmission system in which a service company transmits information, for example, ASP (Application Service Provider) receives contents of actual newspaper articles, namely contents from a newspaper company in advance, and stores the contents in the database, and transmits the information according to the request of a user. FIG. 3 shows that a user 11 (for instance, a corporation), a provider of contents 12 (for instance, a newspaper company) and an information transmission apparatus 10 of a service company are connected via a network 13.

An input unit 14, an output unit 15 and a contents database 16 that stores the contents of articles of an actual newspaper together with, for example, layout information in newspaper space are connected to the information transmission apparatus 10. The contents stored in the contents database 16 will be explained later.

The information transmission apparatus is comprised of a receiving unit 21 that receives requirements from a user, a providing unit 22 that provides contents of articles of an actual newspaper to a user 11, a retrieval unit 23 that retrieves the contents database 16 according to the request of the user 11, a reference unit 24 that refers the contents of the contents database 16 in accordance with the retrieval results of the retrieval unit 23, and a payment unit 25 that pays to the contents provider 12 an information provision fee that remains after a handling commission has been subtracted from an information fee paid by the user.

Figure 4:
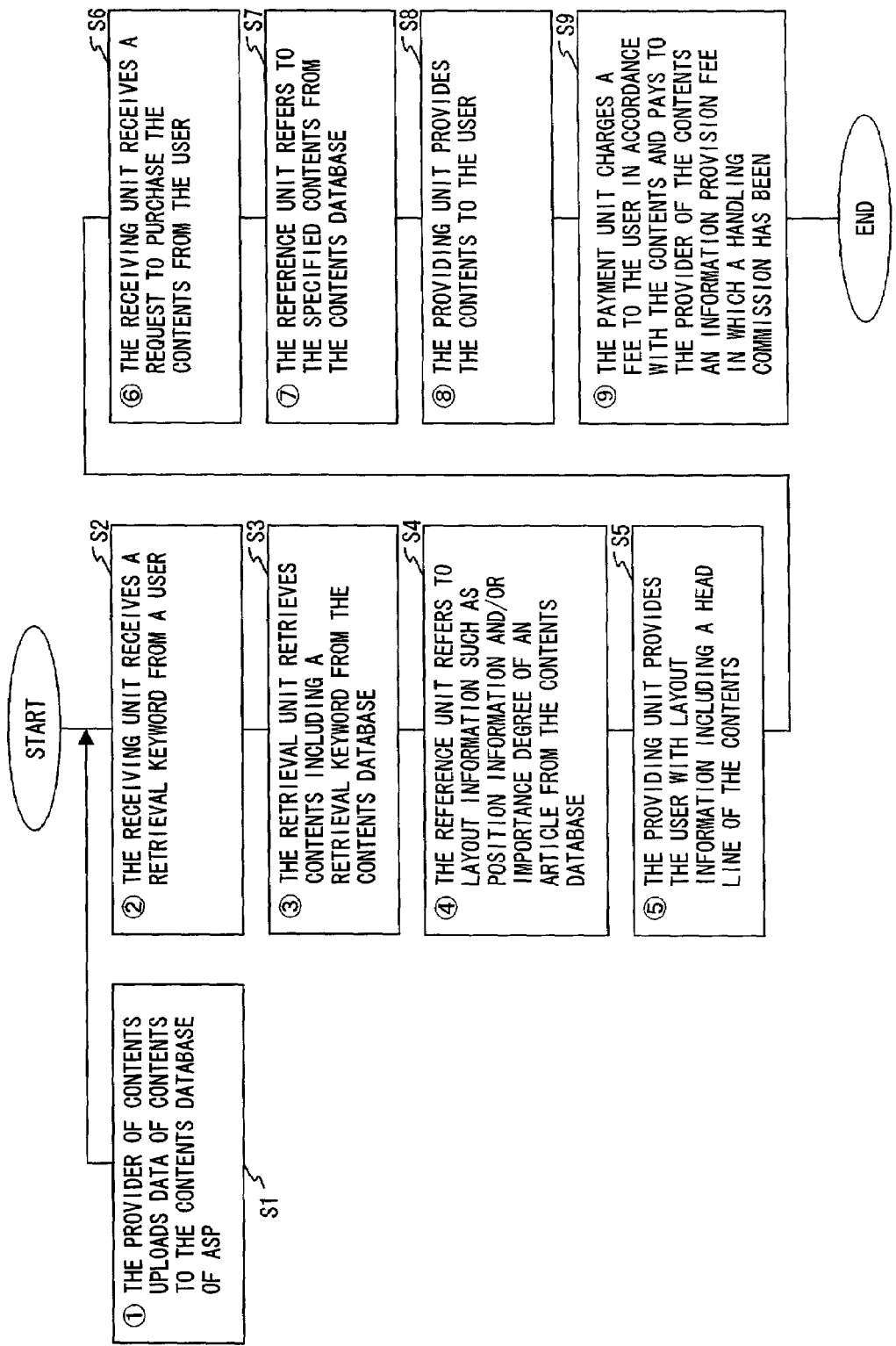
FIG. 4 is a flowchart showing the processing of the information transmission apparatus in the first embodiment of the present invention.

FIG. 4 is a flowchart showing the process which takes place in the information transmission apparatus 10 in the first embodiment of the present invention. The process shown in FIG. 4 is hereinafter explained with reference to FIG. 5 showing the method for performing communications in the first embodiment of the present invention.

The process in Step S1 shown in FIG. 4 is the process that is executed by a contents provider 12. The contents provider 12 uploads data of the contents to the contents database 16 connected to an information transmission apparatus of a service company, as shown in ① of FIG. 5.

Figure 15:
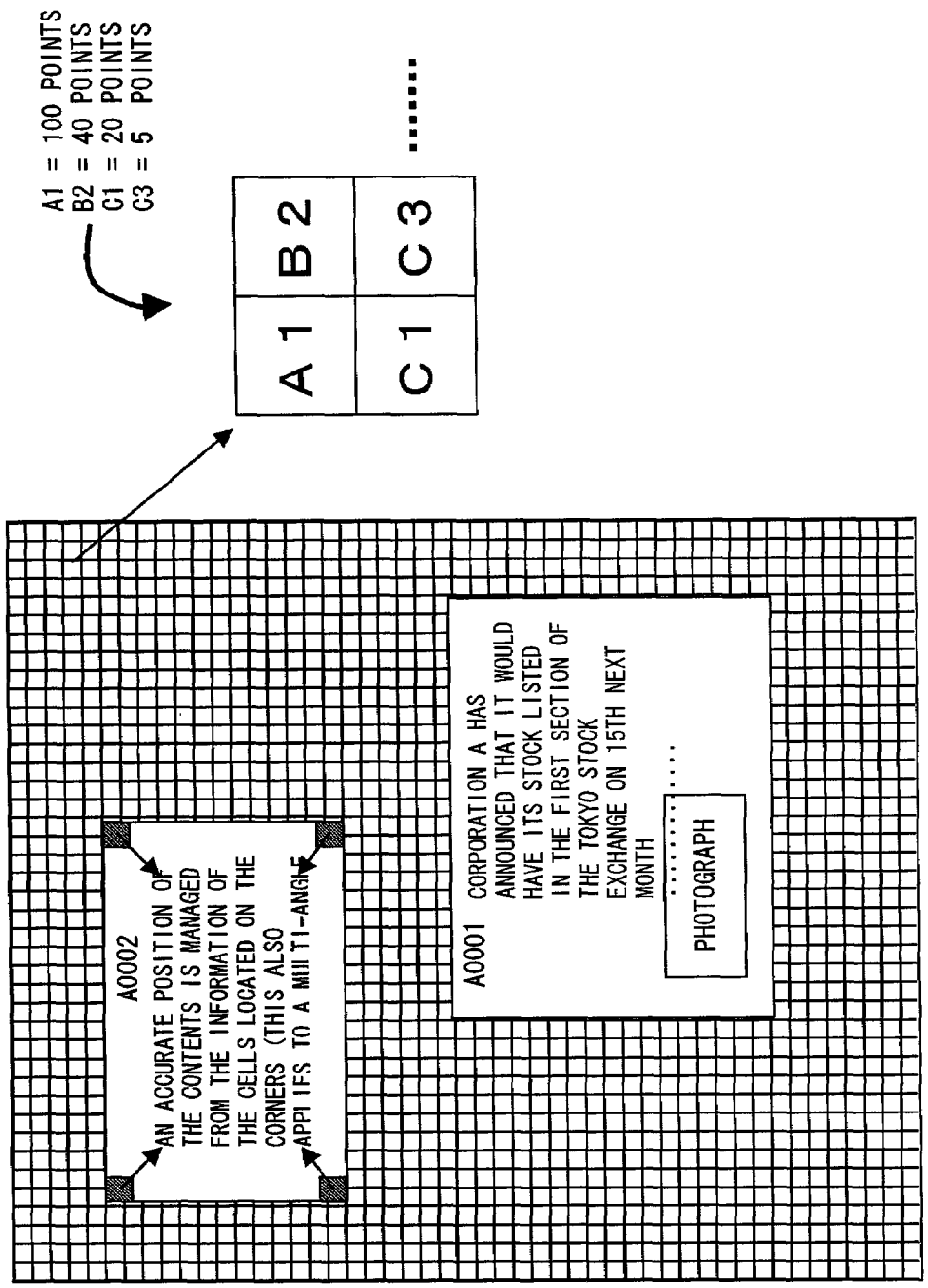
FIG. 15 is a diagram showing the method for managing the positions of articles and the difference of importance degree of articles.

The process in Steps S2 to S9 shown in FIG. 4 is the process that is executed by the information transmission apparatus 10. First, the receiving unit 21 receives a retrieval keyword from a user 11 in Step S2, as shown in ② of FIG. 5. The retrieval unit 23 retrieves the contents including a keyword from the contents database 16 in Step S3, as shown in ③ of FIG. 5. The reference unit 24 refers to layout information, for example, the position of an article in newspaper space, and/or importance degree of an article which decided by a newspaper company in Step S4, as shown in ④ of FIG. 5. The providing unit 22 provides layout information including headlines of the retrieved contents to the user 11 via the network 13 in Step S5, as shown in ⑤ of FIG. 5. Concerning the position information, a method, for example, for reading the newspaper space as an image and setting a position information ID for each area of each article can be considered. However, the method can be any method, and is not limited to this method, if it can transmit to the user the value of an article that the information provider takes into consideration. FIG. 15 shows an example of this method.

Figure 5:
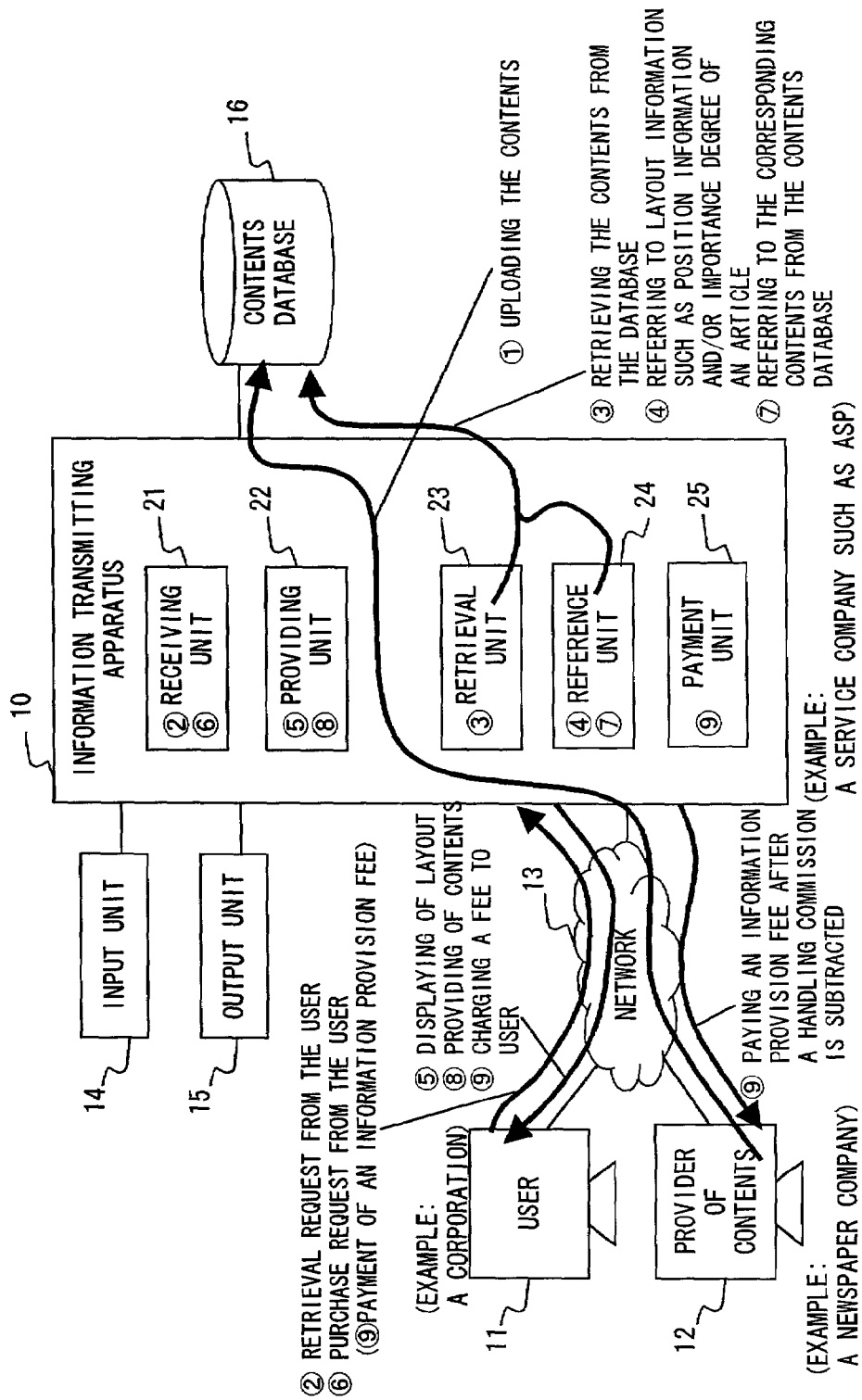
FIG. 5 is a block diagram showing the method for performing communications in the first embodiment of the present invention.

The user 11 determines a purchase object (i.e. articles that the user wants to obtain) based on the layout information displayed on the terminal screen of the user, and the user requests the receiving unit 21 to purchase the contents in Step S6, as shown in ⑥ of FIG. 5, the receiving unit 21 receives this request, the reference unit 24 refers to the contents specified by the user from the contents database 16 in Step S7, as shown in ⑦ of FIG. 5, the providing unit 22 provides said contents to the user via a network 13 in Step S8, as shown in ⑧ of FIG. 5, and finally, the payment unit 25 pays to the contents provider 12 an information provision fee that remains after a handling commission has been subtracted from the information fee paid by the user in Step S9, as shown in ⑨ of FIG. 5.

Figure 6:
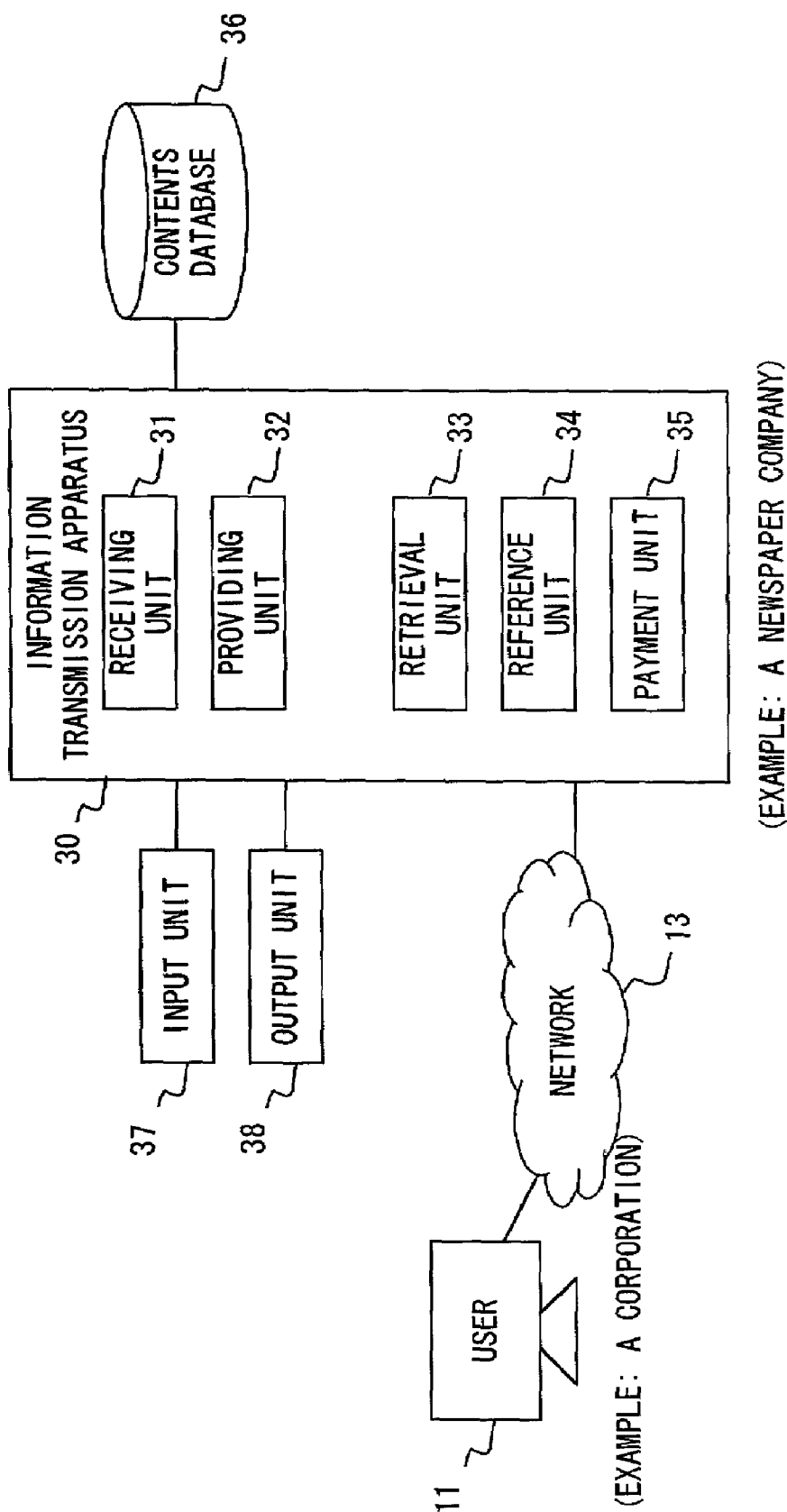
FIG. 6 is a block diagram showing the configuration of the information transmission system in the second embodiment of the present invention.

FIG. 6 is a block diagram showing the configuration of the information transmission system in the second embodiment of the present invention, in which a contents provider such as a newspaper company directly transmits information to a user 11 via the network 13 without using a service company that carries out information transmission.

In FIG. 6, the information transmission apparatus 30 installed in a newspaper company is connected to a personal computer of the user 11 via the network 13. A contents database 36, an input unit 37 and an output unit 38 are connected to the information transmission apparatus 30 which is comprised of a receiving unit 31, a providing unit 32, a retrieval unit 33, reference unit 34 and a payment unit 35, as shown in FIG. 6.

Figure 7:
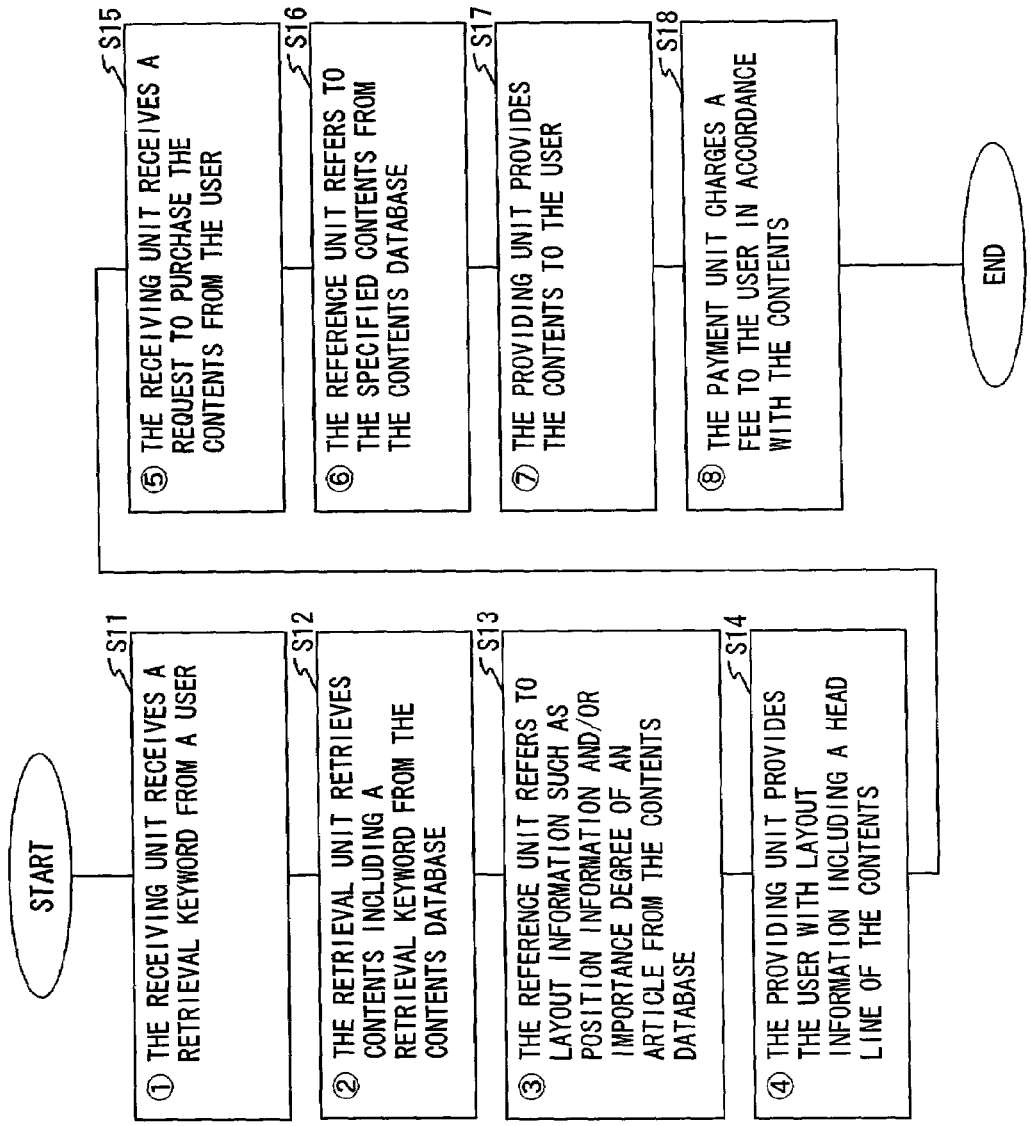
FIG. 7 is a flowchart showing the processing in the second embodiment of the present invention.

FIG. 7 is a flowchart showing the process which takes place in the information transmission apparatus 30 of a contents provider in the second embodiment of the present invention. The process shown in FIG. 7 is hereinafter explained with reference to FIG. 8, showing the method for performing communications in the second embodiment of the present invention.

Figure 8:
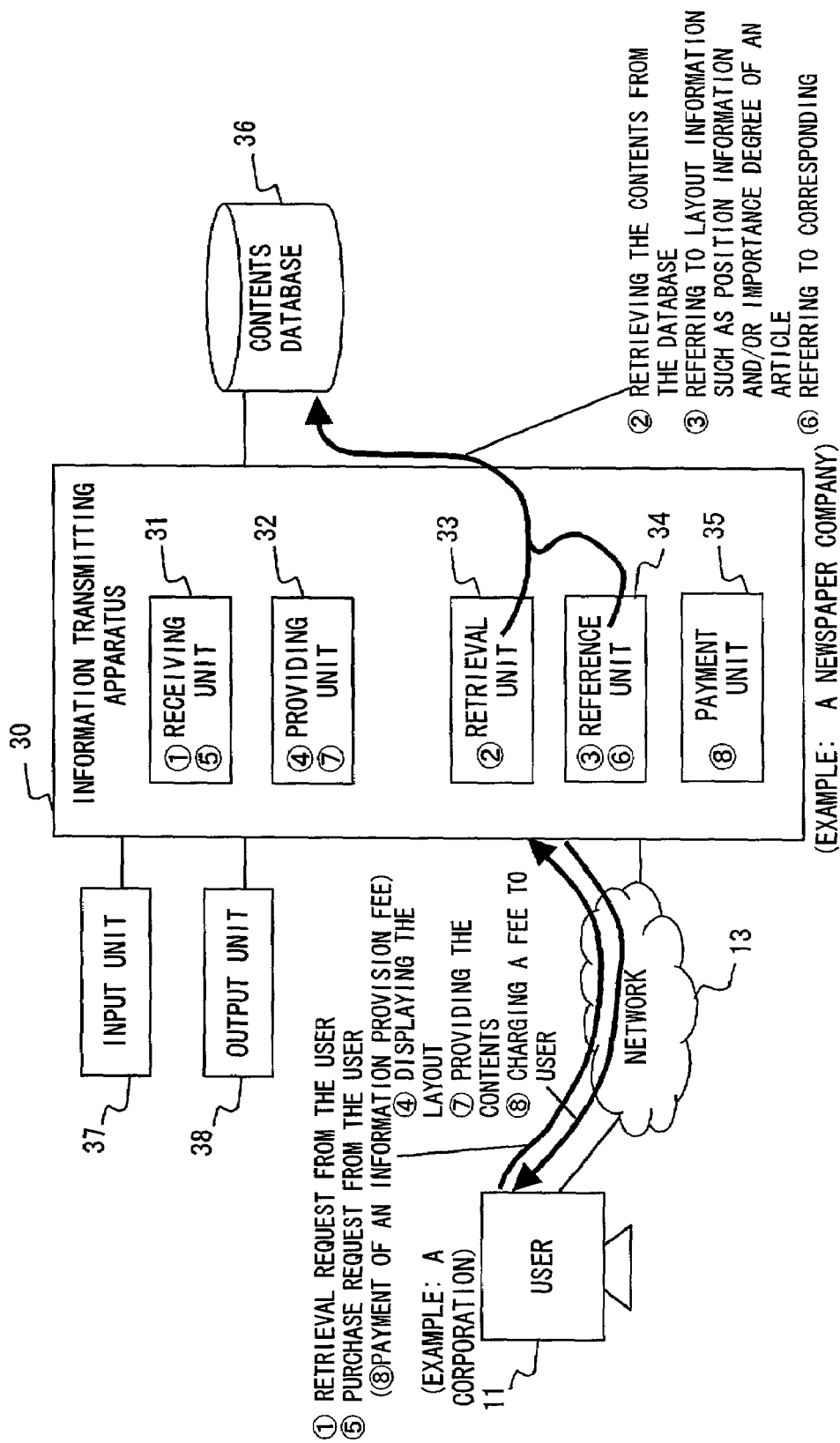
FIG. 8 is a block diagram showing the method for performing communications in the second embodiment of the present invention.

First, a receiving unit 31 receives a retrieval keyword from a user 11 via a network 13 in Step S1, as shown in ① of FIG. 8, a retrieval unit 33 retrieves contents including the retrieval keyword from a contents database 36 in Step S12, as shown in ② of FIG. 8, a reference unit 34 refers to layout information such as the position information, importance degrees, etc. of contents in Step S13, as shown in ③ of FIG. 8, a providing unit 32 provides the layout information of the retrieved contents, including headlines, to the user 11 in Step S14, as shown in ④ of FIG. 8.

The user 11 determines the contents that should be purchased based on that layout information, the receiving unit 31 receives a request for purchasing contents from the user 11 in Step S15, as shown in ⑤ of FIG. 8, the reference unit 34 refers to the specified contents from the contents database 36 in Step S16, as shown in ⑥ of FIG. 8, the providing unit 32 provides the user with the contents referred to by the reference unit 34 in Step S17, as shown in ⑦ of FIG. 8, the payment unit 35 in Step S18 charges an information fee to the user in accordance with the contents used, and then terminates the process, as shown in ⑧ of FIG. 8.

Figure 9:
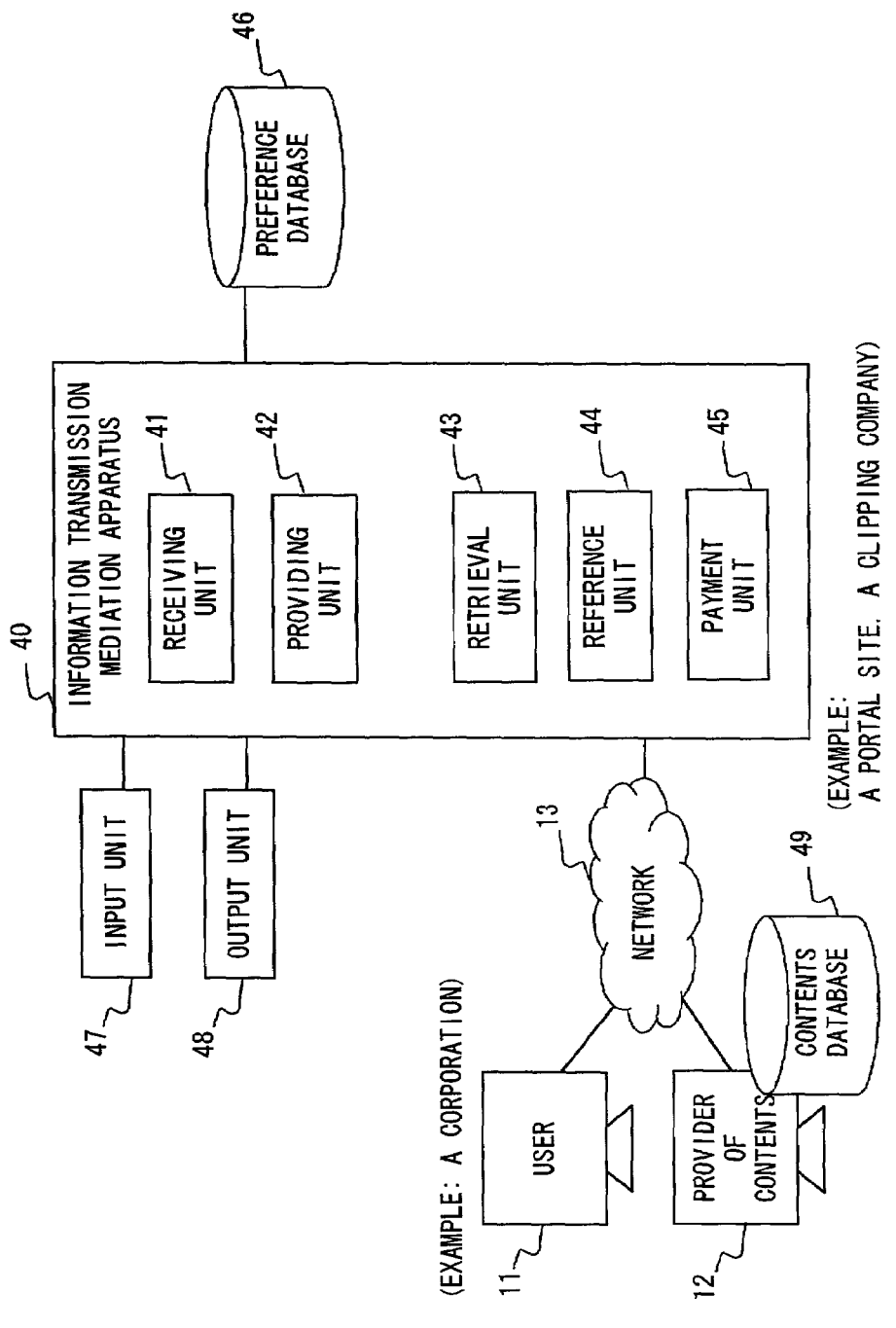
FIG. 9 is a block diagram showing the configuration of the information transmission system in the third embodiment of the present invention.

FIG. 9 is a block diagram showing the configuration of the information transmission system in the third embodiment of the present invention. In the third embodiment, actual information is directly transmitted from a contents provider to a user via a network, while a service company such as a portal site and a clipping company plays an information-portal role, i.e. acts only as an intermediary for information transmission.

In FIG. 9, the user 11 is connected to the contents provider 12 via the network 13, and a contents database 49 is installed on the side of the contents provider 12.

Also, in this third embodiment, a preference database 46 is assumed to be connected to an information transmission mediation Apparatus 40. This preference database 46 stores a keyword for the information that the user wants to obtain as the user's preference suitable to each user. A keyword that the user has inputted in advance is stored in the preference database, and is referred to and used each time a process is executed. Details about the keyword stored in the preference database will be explained later.

An input unit 47 and an output unit 48 are connected to the information transmission mediation apparatus 40, and the information transmission mediation apparatus is comprised of a receiving unit 41, a providing unit 42, a retrieval unit 43, reference unit 44 and a payment unit 45.

Figure 10:
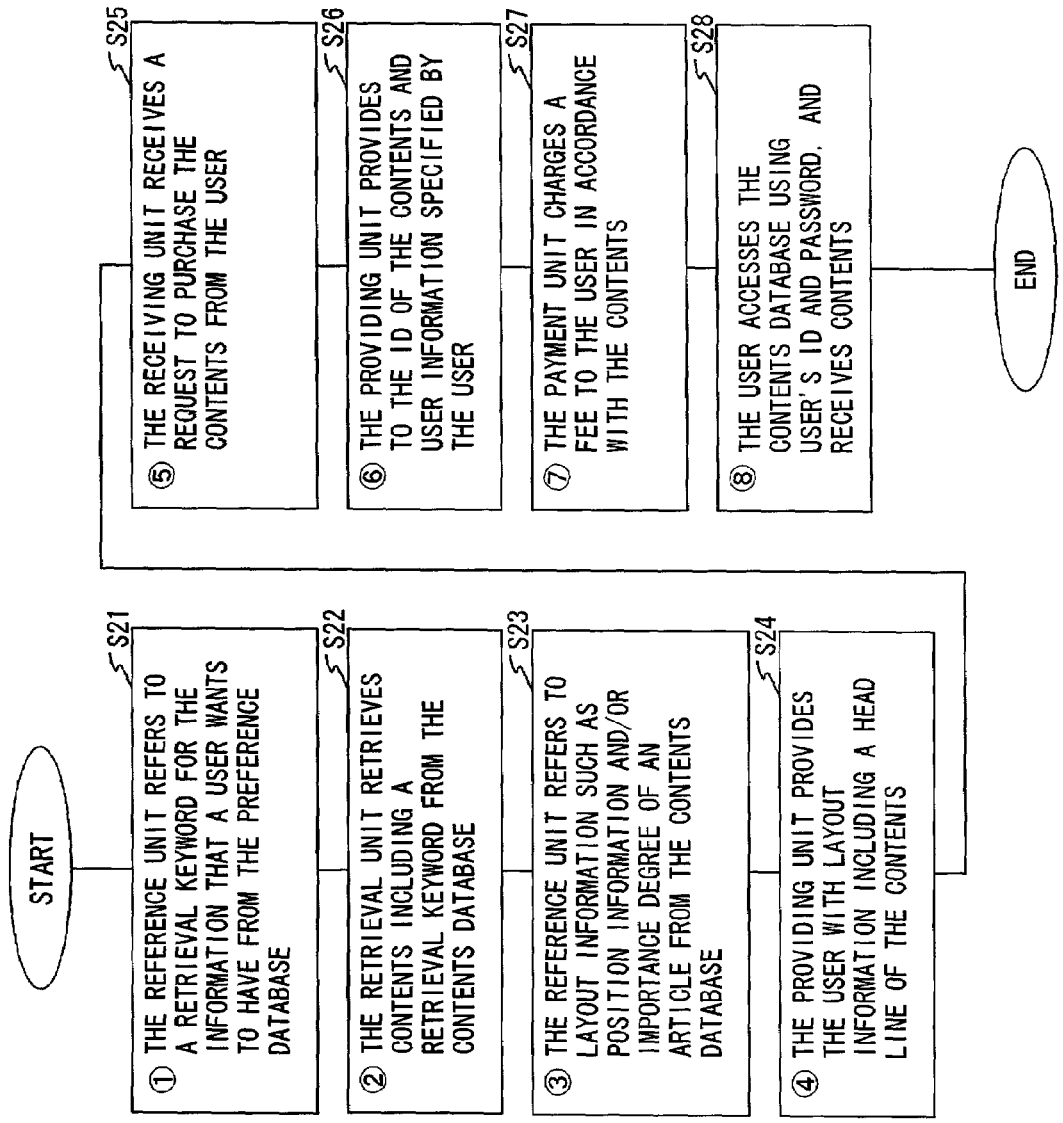
FIG. 10 is a flowchart showing the processing in the third embodiment of the present invention.

FIG. 10 is a flowchart showing the process executed by the information transmission mediation apparatus 40 of a clipping company in the third embodiment of the present invention. The processing shown in FIG. 10 is hereinafter explained with reference to FIG. 11 showing the method for performing communications in the third embodiment of the present invention.

In FIG. 10, when the process is started, the reference unit 44 refers to a retrieval keyword of the information that a user wants to obtain from a preference database 46 in Step S21, as shown in ① of FIG. 11, a retrieval unit 43 retrieves contents including the keyword from the contents database 49 via the network 13 in Step S22, as shown in ② of FIG.

11, a reference unit 44 refers to layout information such as the position information, importance degree, etc. of the retrieved contents from the contents database 49 in Step S23, as shown in ③ of FIG. 11, a providing unit 42 provides layout information including headlines of the retrieved contents to the user 11 via the network 13 in Step S24, as shown in ④ of FIG. 11.

As in the first and second embodiments, the user 11 also determines the contents that should be purchased by viewing the provided layout information, and requests the receiving unit to purchase said contents, as shown in ⑤ of FIG. 11. The receiving unit 41 receives this request in Step S25 of FIG. 10, and the providing unit 42 provides the contents provider 12 with the ID of the contents (contents ID) specified by the user and information about the user such as the user's ID and password via the network 13 in Step S26, as shown in ⑥ of FIG. 11.

In the information transmission mediation apparatus 40 of a clipping company, the payment unit 45 charges an information fee to the user 11 in Step S27, as shown in ⑦ of FIG. 11, and receives payment from the user 11 and pays the contents provider 12 an information fee in which a handling commission has been subtracted from the amount paid by the user 11.

The contents specified by the user are directly provided from the contents provider 12 to the user 11 via the network 13, as shown in ⑧ of FIG. 11. This process is executed by the user 11 in Step S28 in FIG. 10. That is, the user 11 accesses the contents database 49 using the user's ID and password, and receives the contents from the contents database 49. Then, the process is terminated.

It has been explained that in FIG. 10, the contents provider 12 is notified of the ID of the contents specified by the user 11, and then the contents are provided to the user 11. However, there is another method in which the user is also notified of the ID of the contents, and the user receives the contents by accessing the contents database 49 using the ID of the contents and the user's ID and password in Step S28 in FIG. 10. In addition, the processes in Step S27 and in Step S28 do not necessarily have to be executed in this sequence, but can be executed in parallel.

Also, it has been explained that in this third embodiment, a keyword of the information that the user wants to obtain is stored in the preference database 46 in advance, and the keyword is referred to from the preference database 46, for example, everyday by being specified by the user, and the contents are provided to the user based on the processing shown in FIG. 10. However, even when the information transmission mediation apparatus 40 acts only as a go-between for information provision, it is of course possible for the user to receive the contents by giving a retrieval keyword to a clipping company, as is the case with the first and second embodiments.

FIG. 12 is a diagram showing an example of a layout display window displayed on the terminal unit of a user. This is an example of a layout display window that is common to the first, second and third embodiments. In this example, headlines of six articles are displayed in accordance with the same layout as that in newspaper. Also, the contents of actual articles are displayed in such a manner that the user cannot refer to them at this point.

Upon viewing such a layout, the user can know that, for instance, an article with a head line "A社、本日上場" appears on the top of a page, and it is thus an important article. At the same time, the user can select headlines on the layout display window and request the receiving unit of the information transmission apparatus to purchase the contents of the headlines he has selected, as described in Step S6 in FIG. 4.

FIG. 13 is a diagram showing an example of a contents display window that is displayed on the terminal unit of a user by specifying, for instance, a headline of "A社、本日上場" on the layout display window. This display window shows, for instance, an example of the contents that are provided to the user in Step S8 in FIG. 4, and only the text of articles with the headlines specified by the user is displayed on the display window. Then, the user is informed that 45 yen as the information fee has been charged to the user.

Figure 14:
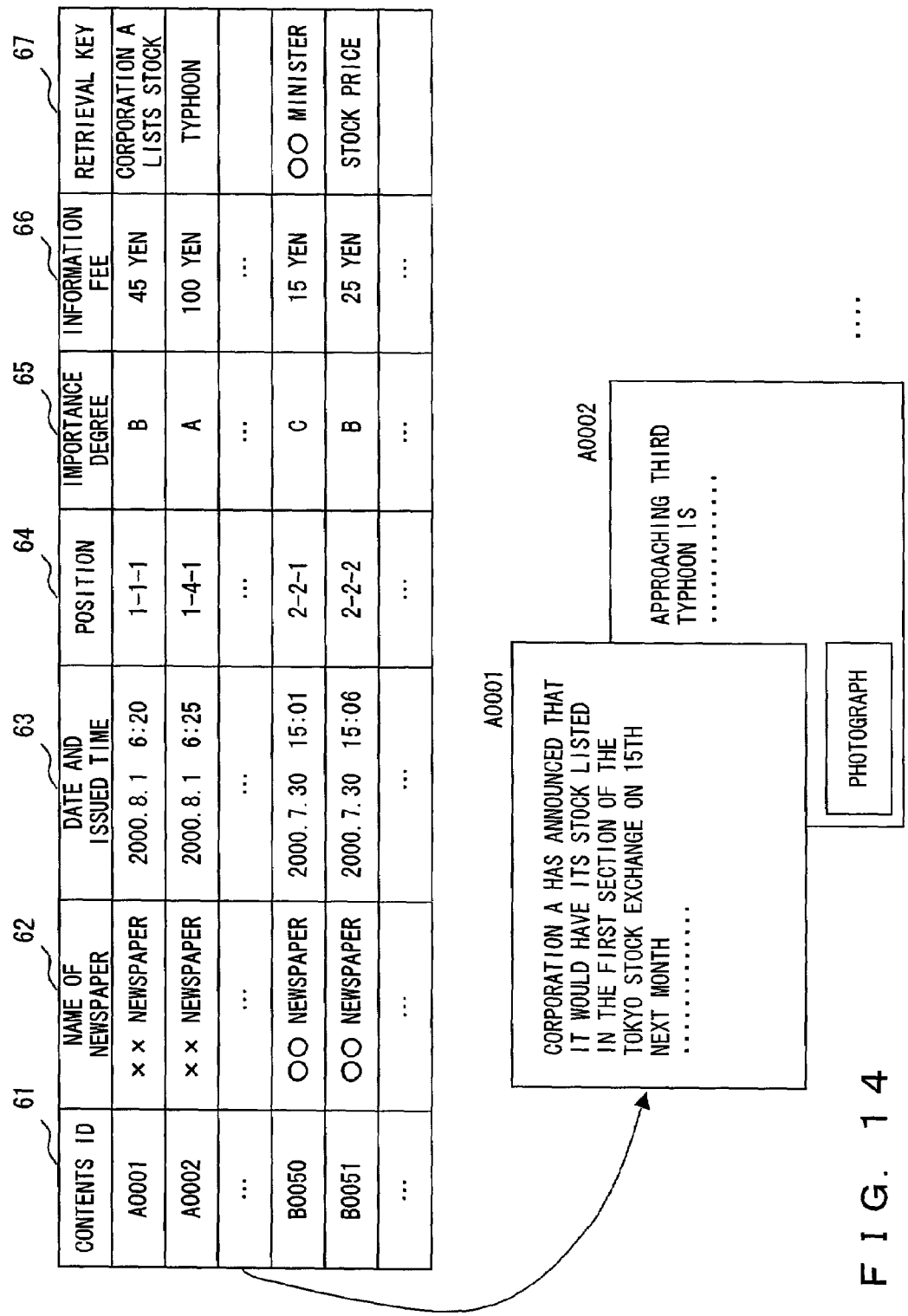
FIG. 14 is a diagram showing an example of data stored in a contents database.

FIG. 14 is a table showing an example of data stored in a contents database. This is an example of a contents database that is common to the first, second and third embodiments. Corresponding to each contents such as newspaper articles, contents ID 61, name of newspaper 62 as an information source, date and issued time 63 of newspaper as the date and time of the information announcement, and the positions 64 on newspaper articles 64 are stored in said contents database. For example, 1-1-1 that shows a position 64 concerning to contents ID "A0001" represents the first article in the first column in the first page of a newspaper.

The importance degree 65 described in the table shown in FIG. 14 is the importance degree that, for example, a newspaper company has given to a newspaper article. The information fee 66 described in the table is the information fee specified by the newspaper company that is to be paid for the contents provided. The information fee can be determined in accordance with the importance degree of the information provided, but is not limited to it. The retrieval keyword 67 is the keyword used to retrieve the contents. Each of the contents (here, newspaper articles) can be identified by specifying a contents ID 61.

FIG. 15 is a diagram showing the method for managing the positions of articles and the difference of importance degrees of articles. First, concerning the management of the positions of articles, it is possible to manage accurate positions of the contents by dividing newspaper space into a number of cells and using the cells located of the four corners of an article, for instance, of contents ID A0002, instead of managing the positions of articles based on the position, the column and the page the articles are appear as shown in FIG. 14.

Next, concerning the importance degree of articles, it is possible to obtain the total sum of the cells (importance-degree points) included in each of the contents and calculate the importance degree of each of the contents by having determined the importance degree for each cell occupied by an article in advance. For instance, in FIG. 15, if the contents A0001 is supposed to include 20 cells of cell A1, 30 cells of cell B2, 40 cells of cell C1, and 100 cell of cell C3, and the importance degree is supposed to be that A1 is 100 points, B2 is 40 points, C1 is 20 points, and C3 is 5 points, the importance degree of the contents A0001 is 4500 points.

In this method, the algorithm for setting the importance degree such as techniques, characteristics and know-how that an editor uses when laying out information is digitized. To be more specific, if there is know-how (empirical knowledge) that the right hand side of the first column on the first page is the position having the highest impact on readers, it is possible to give a high importance degree by collecting the cells of A1 having a high number of points in the vicinity of this area. The method for dividing cells is the same as an ordinary method for bit-mapping.

Figure 16:
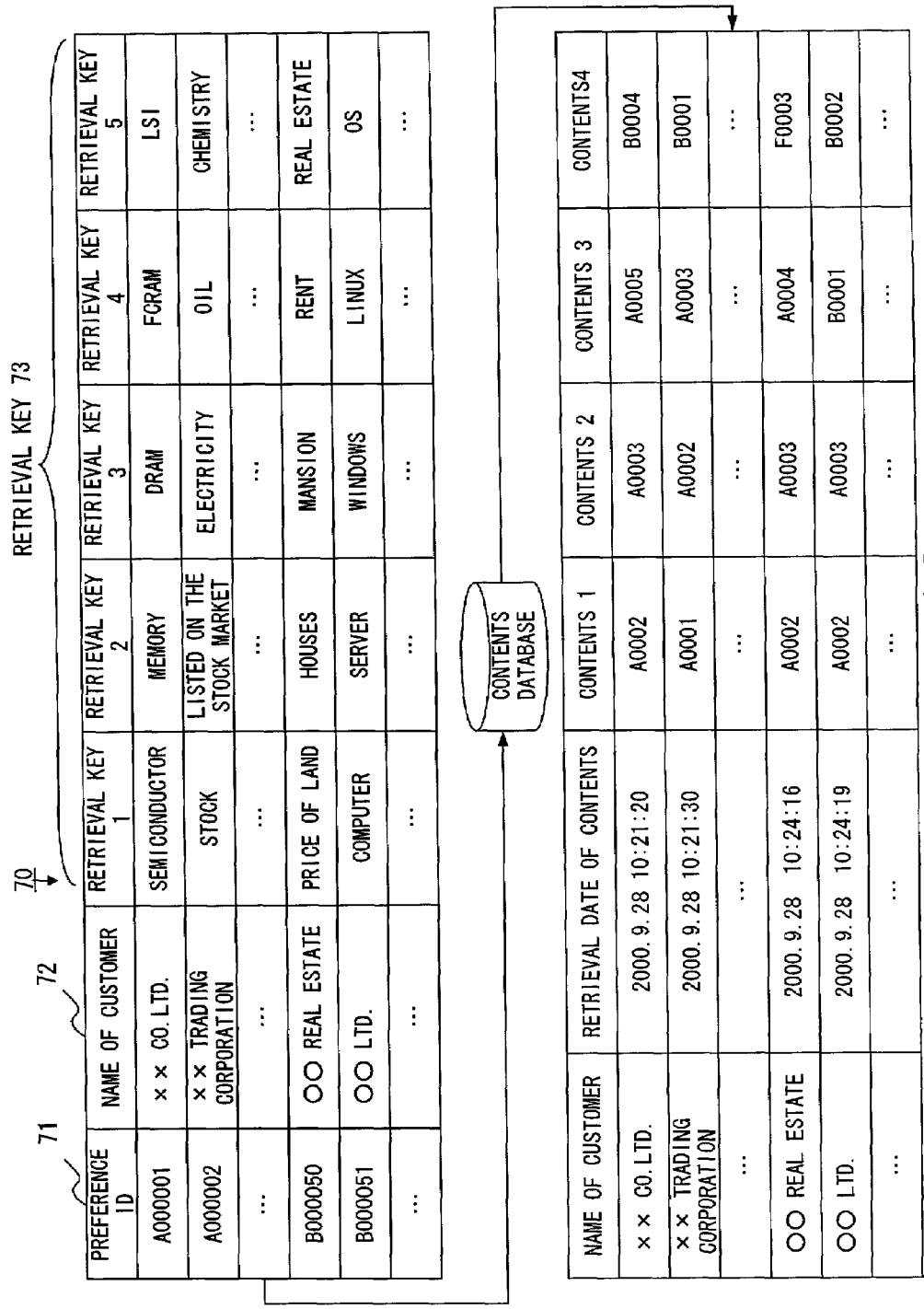
FIG. 16 is a diagram showing an example of data stored in a preference database.

FIG. 16 is a diagram showing an example of data stored in the preference database in the third embodiment. The preference database 70 indicated on the upper side of FIG. 16 stores a retrieval key 73 specified by the user that is a retrieval key 73 suitable for the contents that the user wants to obtain together with the preference ID 71 corresponding to the name of that user 72.

Each time retrieval of the preference database is requested by the user or in the case that retrieval of the contents from the articles of each day's newspaper is required in advance, the contents including a retrieval keyword are retrieved from the contents database, as described in Steps S21 and S22 in FIG. 10. For a customer of, for instance, ○○ Real Estate (in the example shown in FIG. 16), the contents specified with the contents IDs, A0002, A0003, A0004 and F0003, are retrieved.

Figure 17:
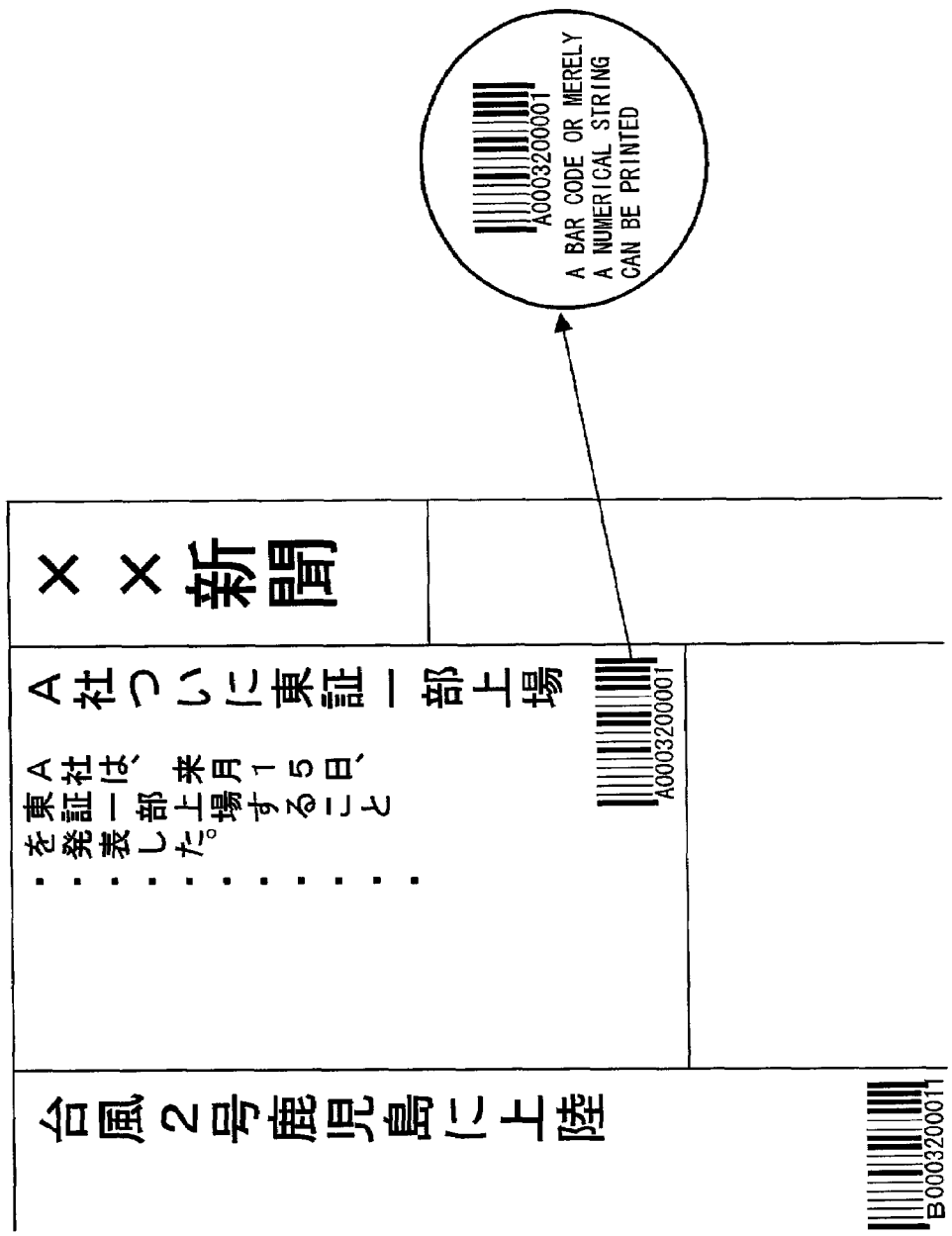
FIG. 17 is a diagram showing an example of a barcode appended to each newspaper article.

Another embodiment that is different from the first, second and third embodiments is hereinafter described using FIG. 17. A barcode is printed for each article in a newspaper space, as shown in FIG. 17. For instance, contents ID is bar-coded. For instance the URL of the Web in which the contents are registered is bar-coded. However, the code can be any code, and is not limited to a barcode, if it is linked with the contents and can identify the contents.

In this embodiment, which is different from the first, second and third embodiments, a newspaper company, for example, directly sells part of articles to a corporation or an individual person. The newspaper company is supposed to provide free of charge a corporation or an individual person with software for reading the barcodes. For instance, a public relations department or a general affairs management department of a corporation actually purchases a newspaper, reads necessary articles in the purchased newspaper using the barcodes, collects only the articles specified by the barcodes, and puts the collected articles on the local area network in the corporation as a virtual newspaper. The directors or employees of the corporation can click on the headlines of articles they want to read, as if they were reading an actual newspaper, and then the contents database in the newspaper company is automatically connected, thus enabling them to obtain the information that they want to obtain. At that time, an electronic payment settlement is carried out between the newspaper company and the corporation. In this embodiment, merely a numerical string, and is not limited to a barcode, can be printed so as to allow character recognition to be performed with an optical character reader.

Generally, it is a usual practice for a public relations department or a general affairs management department of a corporation to select contents before disclosing the contents in the corporation. Also, a certain time lag is considered to exist from the time when a newspaper is published to the time when contents are stored in a contents database.

Therefore, it is possible to publish a virtual newspaper on the local area network of the corporation before than the contents database is retrieved, by picking up necessary articles using barcodes after the public relations department or the general affairs management department of the corporation purchases a newspaper.

A heavy concentration of access to the contents database can be relieved by publishing such a virtual newspaper on a LAN, and a time slot for access can also be dispersed or delayed. The embodiment of printing barcodes on paper is effective particularly if the timing of issuing a newspaper is earlier than the contents are stored in the contents database.

Figure 18:
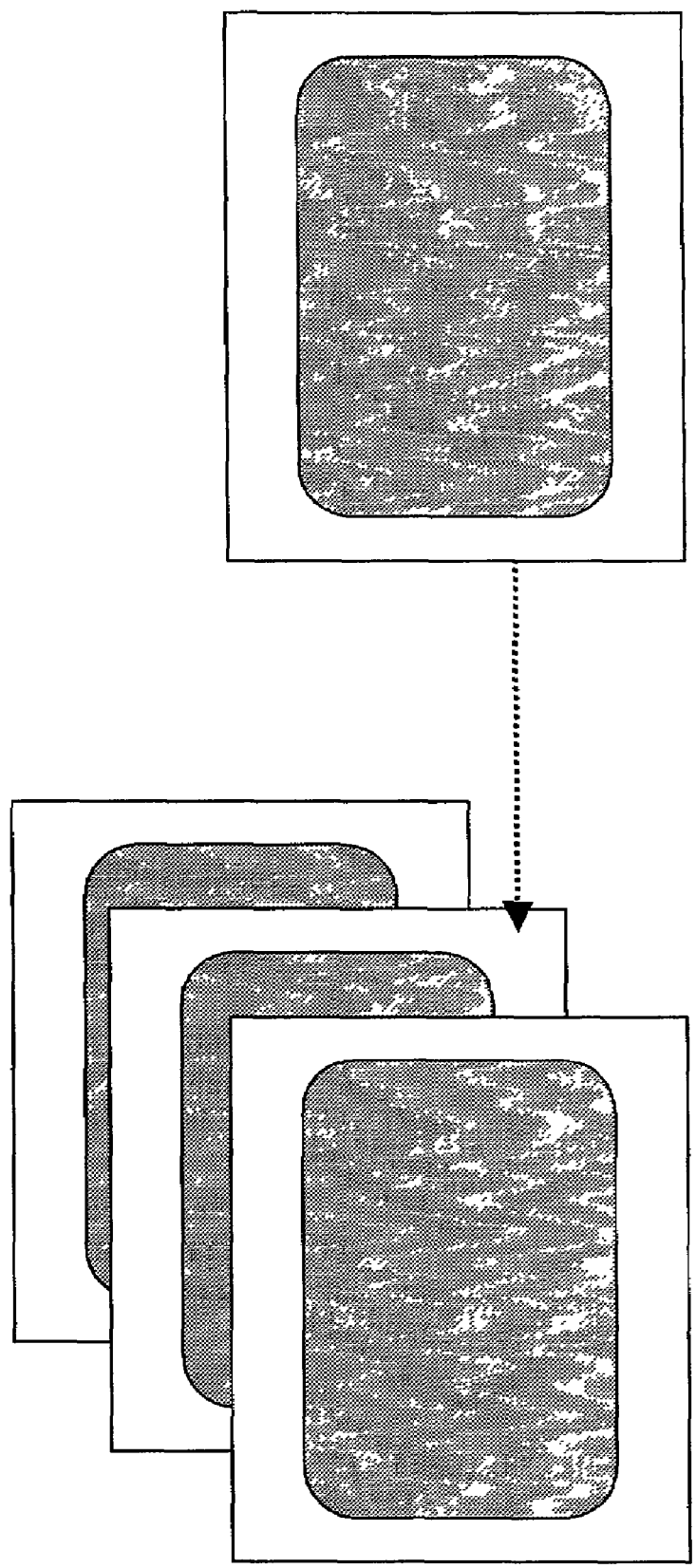
FIG. 18 is a diagram showing an example in which the present invention is applied to a TV screen.

FIG. 18 is a diagram showing an example in which the present invention is applied to a TV screen. Animations such as a TV image can be considered to be a collection of multiple static images. When observing a TV image chronologically, the importance degree of each piece of image information is different depending upon not only the contents of the image but also in which time slot the image is run. For example, seven o'clock p.m. on Sunday is a prime time, and at this time slot the importance degree of information is deemed to be high. In other words, the importance degree of information differs greatly depending not merely upon the contents of the information but also upon the position the information is provided to a person who views or listens to it (for example, a two-dimensional position, three-dimensional position and chronological position), i.e. how the information is provided.

For example, when contents are transmitted using the Internet, a virtual world comes close to approximating an actual world by considering the factor of how the information is treated as well as the contents of the information as an important factor, and by displaying the above-mentioned layout information, In the case of TV broadcasting, for example, a high sponsor fee is charged for a commercial program to be run at the a prime time. This is because it is empirically known that TV viewers concentrate at this time slot to view programs. A characteristic of this case is that TV viewers receive information unilaterally, and do not pay any money in accordance with the information provided or the time slot at which the information is provided On the other hand, if interactive media such as digital broadcasting (and provision of information using the Web) is widely spread, a traffic jam could occur at the prime time as a matter of course. In the application example shown in FIG. 18, an information provider can set a high information-provision charge for the prime time, and set a low charge for the time slot when there is less traffic, for example, to alleviate the traffic. The fee charging system that telecommunication carriers and Internet providers have adopted (such as late-night discounts and Sunday discounts) can be realized in the new media by applying the "method for transmitting and receiving information using (time-differentiating) layout information."

The present invention is summarized as follows.

(A) In the event that information in a paper medium is transmitted and received on a network, the point of the present invention is that a reader (a person who browses the Web) can intuitively and visually grasp the importance degree of the information, pick up only the information the reader wants to view, and pay an information fee for only the information that he wants to view. In addition, information providers can apply the knowledge of editing that has been cultivated in paper media to the editing on the Web, thus making it possible to transmit information effectively particularly to the readers of the generation that has experienced paper media.

(B) To transmit and receive information using time-differentiating layout information suggests how a combination of a conventional TV broadcasting and the Internet should be combined. On the Internet, to change information to be provided moment by moment according to the passage of time is not carried out (though some advertisement banners are shuffled according to the passage of time). In TV broadcasting, on the other hand, information to be provided changes moment by moment, as is understood because there are guides for the TV channels. In order for the Internet to fuse with new media such as digital broadcasting, and for it to permeate into individual homes in the future, there should be an environment where the importance degree and value of the information provided can be intuitively perceived. The present invention is the model that realizes this possibility in a business field.

Finally, described below is the loading of a program of the present invention into a computer. The information transmission Apparatus or the information transmission mediation apparatus of the present invention can be realized by a general computer system.

Figure 19:
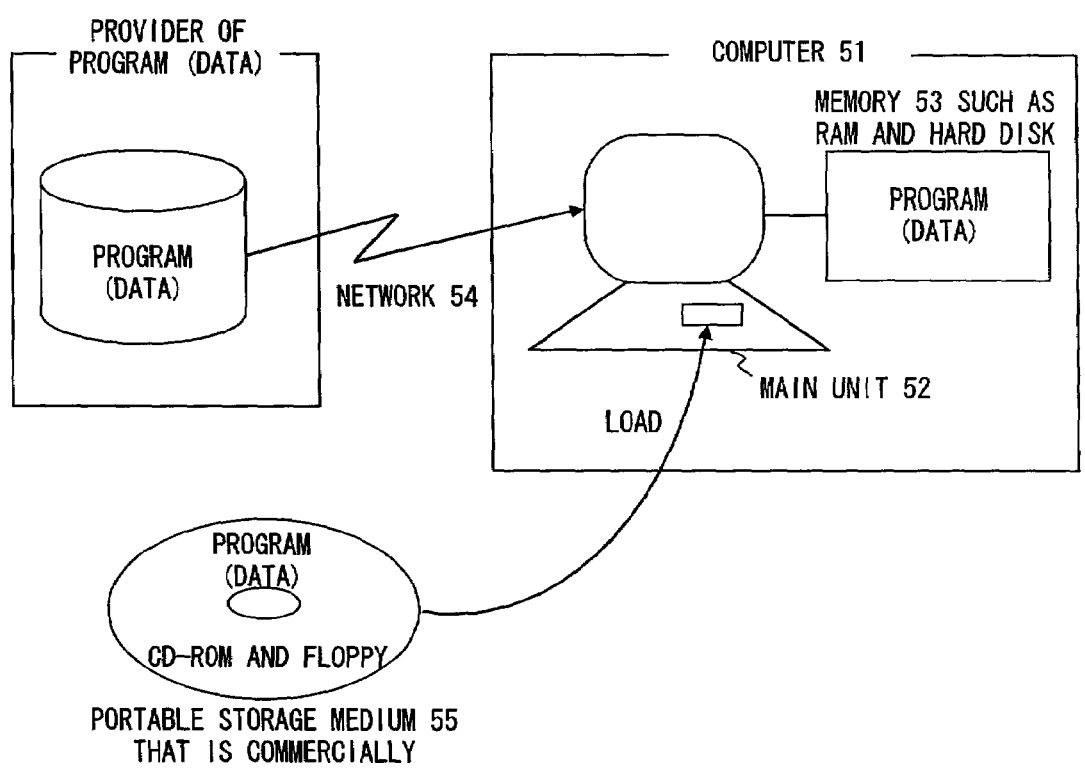
FIG. 19 is a diagram showing the loading of a program into a computer.

FIG. 19 is a diagram showing an example of the configuration of such a computer system. A computer 51 comprises a main unit 52 and a memory 53. The memory 53 is a storage such as a random access memory (RAM), a hard disk and a magnetic disk. A program of the flowchart described in FIGS. 3, 6 and 9 is stored in this memory 53. Information transmission in the present invention can be performed by executing the program using the main unit 52.

This program can be loaded into the computer 51 by a program provider via a network 54, or the program is stored in a commercially available portable storage medium, and the storage medium can be loaded into the computer 51. Various types of storage media such as a CD-ROM, a floppy disk, an optical disk, a magnet-optical disk can be used as the portable storage medium 55. The above-mentioned program is stored in these media, and the program is executed by the computer 51, thereby making it possible to provide and transmit information such as layout information in the present invention.

Figure 20:
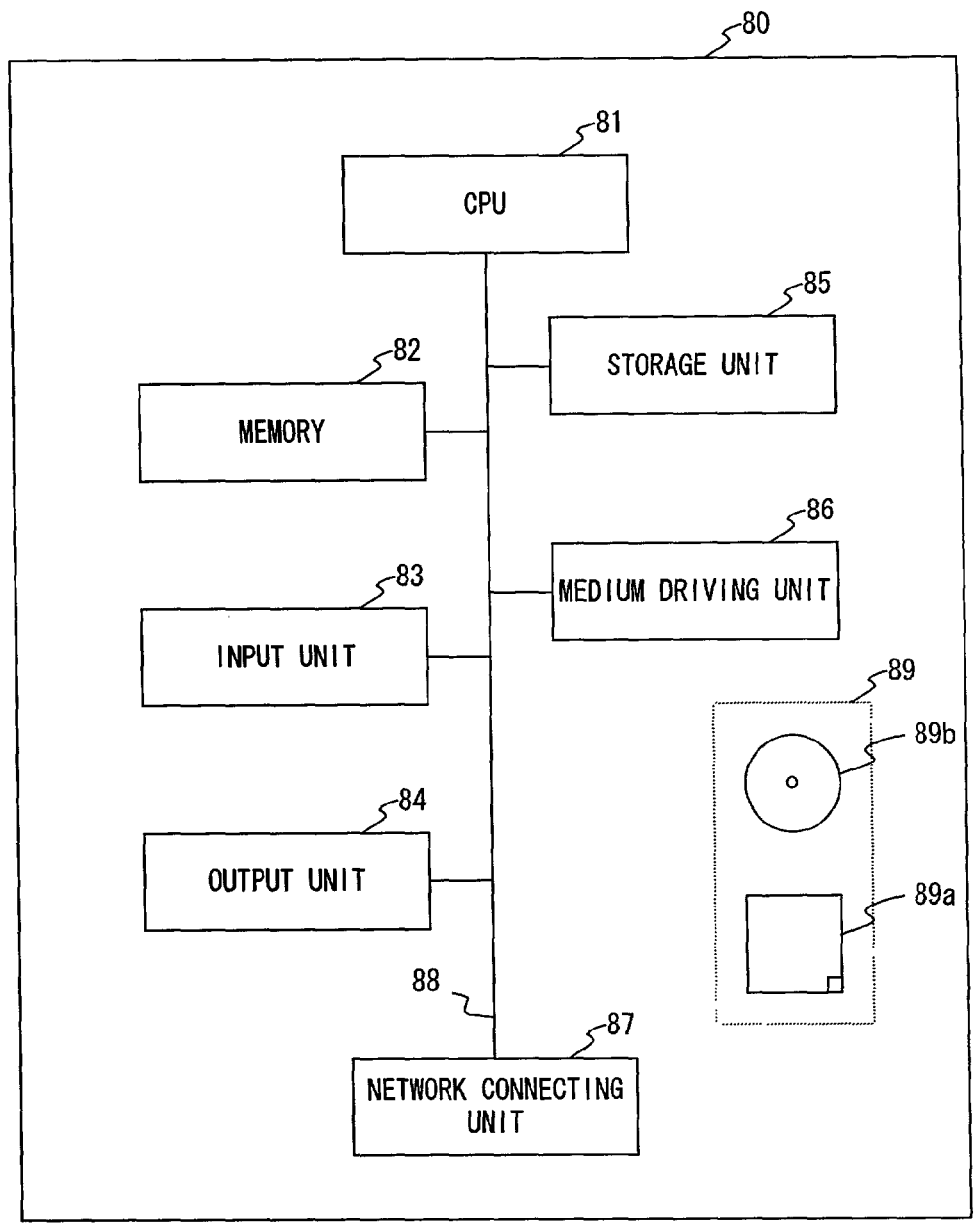
FIG. 20 is a block diagram showing the configuration of the information transmitting and receiving apparatus of the present invention.

FIG. 20 is a diagram showing an example of the configuration of the hardware of the computer 51. A computer 80 shown in FIG. 20 comprises a CPU 81, a memory 82, an input unit 83, an output unit 84, a storage unit 85, a medium driving unit 86 and a network connecting unit 87, and these units are connected to a bus 88. The configuration shown in FIG. 20 is only an example, and a computer configuration is not limited to said configuration.

The CPU 81 is the central processing unit that controls the whole computer 80. The memory 82 is the memory such as a RAM that temporarily stores a program or data stored in the storage unit 85 (or the portable storage medium 89) when the program is executed or the data is updated. The CPU 81 executes various processes mentioned above using the program or data stored in the memory 82. The input unit 83 is, for example, a keyboard, a pointing device, or a touch panel, and is used to input information and instructions from a user. The output unit 84 is, for example, a display screen, etc., and is used for a user to display, for example, the layout mentioned above, the contents, etc. The storage unit 85 is, for example, a magnetic disk, an optical disk, a magnetic-optical disk, etc., and is used to store the program and data that executes various processes and functions as the information transmission method, information transmission apparatus or information receiving apparatus, in which layout information is used.

Or, the program and data can be those that are stored in the portable storage medium 89. In this case, the program and data stored in the portable storage medium 89 are read by the medium driving unit 86. The portable storage medium 89 can be, for example, a floppy disk 89*a*, a CD-ROM 89*b*, a DVD, a magnet-optical disk or any portable storage medium.

Or, the above-mentioned program and data can be those stored in another external apparatus and that are downloaded via a network connected to the network connecting unit 87. The present invention can be configured as a storage medium that itself stores said program and data (such as the portable storage medium 89), or can be configured as a network that itself transmits the program and data (specifically, as a transmission medium itself), or can be configured as a transmission signal that itself is transmitted via this transmission medium when the program and data are downloaded.

Explained so far, is the embodiment of the present invention where mainly newspaper articles and TV images are used as information sources, and the positions and importance degree of articles are used as layout information. However, the present invention can be applied to all information sources such as magazines and image information, and is not limited to newspaper, TV images and so forth. Also, all information that represents the characteristics of contents can be used as layout information. In the above-mentioned example, contents that are retrieved from a contents database are provided to a user, but all the headlines of a newspaper, which is not limited to the retrieved contents, can also be provided to the user.

If the present invention is used, it is possible to make a virtual newspaper on the Internet, and thereby to purchase only articles that a user wants to obtain without paying money for the articles which are of less use. Also, when a user refers to an article at a later time, the user can remember the whole of the original newspaper, so that the user does not lose a merit at paper newspaper.

The merit for a newspaper company is that the newspaper company can charge an information fee for articles in accordance with the number of people who read the articles, and this method is suitable for the protection of copyright. It is also possible to set an individual price for each article, thus causing the profitability of the company to be improved, and making it possible to grasp the popularity of each article and the classes of readers, and to make various analyses such as a reading pattern.

The merit for a service company such as a clipping company is that the service company does not have to carry out physical clipping of articles by using, for example, barcodes, and that the company can earn a handling-commission income in accordance with the real number of newspaper subscribers, while the company always earned a fixed level of income in the past even if a corporation with which the company had made a contract illegally copied the articles.

The merit for a corporation that receives information is that the corporation can economize paper resources, and the corporation is released from bothersome work, such as clipping and filing.

As has been explained so far, in the present invention, a user can easily select articles that he wants to obtain, and can receive only the articles that he needs, by the provider providing the user with information showing the positions and importance degree of articles in newspaper space as layout information.

The newspaper company as an information source of articles can set the price in accordance with the information volume of each article, and can easily grasp and analyze the popularity of each article and the classes of readers. In addition, the newspaper company stores, in advance, a retrieval keyword showing the information that each user wants to obtain as a preference, and can display the layout information based on the preference according to a user's request, thus greatly contributing to enhancing the practicality of a partial information transmission system.

What is claimed is:

1. An information distributing method for distribution of information corresponding to a request from a user terminal, comprising:

receiving the request from the user terminal and transmitting, to the user terminal, headlines attached to respective information sets that may correspond to the received request and information indicating a way in which these information sets are handled in an information source as layout information;

displaying the headlines on the user terminal according to the layout information so the user can select any of the displayed headlines and receiving an identity of the selected headline from the user terminal;

distributing to the user terminal and displaying the information of the set corresponding to the headline the headline identity indicates; and billing the user for the information of the set selected for display by the user, said information indicating the way the information is handled in the information source is information about a position in the information source and/or information about an importance in the information source, wherein the importance degree is calculated based on an importance degree set for each of a plurality of cells dividing a newspaper space in advance and also based on the total sum of the importance degree of the cell occupied by an article on a newspaper layout.

2. An information distributing method for externally receiving necessary information, comprising:

externally outputting a request designating possibly required information;

externally receiving information as headlines attached to respective information sets that may correspond to the received request and information indicating a way the information sets are handled in an information source as layout information;

receiving an identity of a selected headline determined by a user according to the layout information;

externally requesting distribution of the information of the set corresponding to the headline the headline identity indicates;

displaying headlines according to layout information;

prompting a user to select any of the displayed headlines and request a distribution of an information set corresponding to the selected headline; and displaying bill information corresponding to the requested information, wherein said information indicating the way the information is handled in the information source is information about a position in the information source and/or information about an importance in the information source, and wherein the importance degree is calculated based on an importance degree set for each of a plurality of cells dividing a newspaper space in advance and also based on the total sum of the importance degree of the cell occupied by an article on a newspaper layout.

3. A portable computer-readable storage medium storing a program used to direct a computer for distributing information corresponding to a request from a user terminal, by:

receiving the request from the user terminal and transmitting, to the user terminal, headlines attached to respective information sets that may correspond to the received request and information indicating a way in which these information sets are handled in an information source as layout information;

displaying the headlines on the user terminal according to the layout information so the user can select any of the displayed headlines and receiving an identity of the selected headline from the user terminal;

distributing to the user terminal the information of the set corresponding to the headline the headline identity indicates;

distributing to the user terminal and displaying the information of the set corresponding to the headline the headline identity indicates; and billing the user for the information of the set selected for display by the user, said information indicating the way the information is handled in an information source is information about a position in the information source and/or information about an importance in the information source, wherein the importance degree is calculated based on an importance degree set for each of a plurality of cells dividing a newspaper space in advance and also based on the total sum of the importance degree of the cell occupied by an article on a newspaper layout.

4. The-A portable computer-readable storage medium storing a program used to direct a computer for externally receiving of necessary information, by:

externally outputting a request designating possibly required information;

externally receiving information as headlines attached to respective information sets that may correspond to the received request and information indicating a way the information sets are handled in an information source as layout information;

receiving an identity of a selected headline determined by a user according to the layout information;

externally requesting distribution of the information of the set corresponding to the headline the headline identity indicates;

displaying headlines according to laying information; and prompting a user to select any of the displayed headlines and request distribution of an information set corresponding to the selected headline, said information indicating the way the information is handled in the information source is information about a position in the information source and/or information about an importance in the information source, wherein the importance degree is calculated based on an importance degree set for each of a plurality of cells dividing a newspaper space in advance and also based on the total sum of the importance degree of the cell occupied by an article on a newspaper layout.

5. An information distributing apparatus for distribution of information corresponding to a request from a user terminal, comprising:

a handling information retrieval unit receiving a request from the user terminal and retrieving handling information indicating a way information sets are handled in an information source, corresponding to the request;

a layout information output unit outputting to the user terminal a way the information sets are handled in the information source as layout information;

an information distribution unit distributing and displaying information of a set corresponding according to the layout information to the user terminal; and a billing unit billing the user for the information of the set selected for display by the user, said information indicating the way the information is handled in the information source is information about a position in the information source and/or information about an importance in the information source, wherein the importance degree is calculated based on an importance degree set for each of a plurality of cells dividing a newspaper space in advance and also based on the total sum of the importance degree of the cell occupied by an article on a newspaper layout.

6. An information reception apparatus for externally distributing necessary information, comprising:

a request output unit externally outputting a request for designation of possibly required information;

a layout information output unit externally receiving information as headlines attached to respective information sets that may correspond to the request and information indicating a way the information sets are handled in an information source as layout information;

a displaying unit displaying headlines according to the layout information and prompting a user to select any of the displayed headlines; and a distribution request unit externally requesting distribution of the information of the set corresponding to a identified headline, wherein the displaying unit further displaying bill information corresponding to the requested information, and wherein said information indicating the way the information is handled in the information source is information about a position in the information source and/or information about an importance in the information source, wherein the importance degree is calculated based on an importance degree set for each of a plurality of cells dividing a newspaper space in advance and also based on the total sum of the importance degree of the cell occupied by an article on a newspaper layout.

* * * * *

UNITED STATES PATENT AND TRADEMARK OFFICE
CERTIFICATE OF CORRECTION

| | | |
|---|---|---|
| PATENT NO. | : 7,296,225 B2 | Page 1 of 1 |
| APPLICATION NO. | : 09/812849 | |
| DATED | : November 13, 2007 | |
| INVENTOR(S) | : Yusuke Hayashi | |

It is certified that error appears in the above-identified patent and that said Letters Patent is hereby corrected as shown below:

Column 14, Line 18, change "The-A" to --A--.

Signed and Sealed this

Fifteenth Day of July, 2008

JON W. DUDAS
*Director of the United States Patent and Trademark Office*